United States Patent [19]

Emery

[11] Patent Number: 4,644,524
[45] Date of Patent: Feb. 17, 1987

[54] SIMULTANEOUS COMMUNICATION SYSTEM USING TIME DELAYS

[76] Inventor: David L. Emery, 424 Clement Ave., Charlotte, N.C. 28204

[21] Appl. No.: 693,287

[22] Filed: Jan. 22, 1985

[51] Int. Cl.[4] .............................................. H04J 3/00
[52] U.S. Cl. ...................................... 370/29; 370/32
[58] Field of Search ...................... 370/29, 30, 32, 50, 370/108, 109

[56] References Cited

U.S. PATENT DOCUMENTS

| | | | |
|---|---|---|---|
| 3,660,599 | 5/1972 | Wiedmann | 370/29 |
| 3,827,052 | 7/1974 | Tanaka | 370/29 |
| 4,063,041 | 12/1977 | Vollnhals | 370/29 |
| 4,086,429 | 4/1978 | Kotezawa | 370/29 |

Primary Examiner—Robert L. Griffin
Assistant Examiner—M. Huseman
Attorney, Agent, or Firm—Ralph H. Dougherty; James B. Hinson

[57] ABSTRACT

A communication system for simultaneous exchange of signals between first and second stations in which a timing signal of low frequency alternately switches a first station between receive and transmit with equal time periods and simultaneously switches a second station between transmit and receive with the same time periods. During a receive period, signals for transmission are delayed until the next transmit period. During the transmit period, the delay signal is combined with the signal occupying the transmit period. The combined signal along with the timing signal is transmitted by the first station to the second station, after which the first radio station switches to receive under control of the timing signal. The second station under the control of the same timing signal now transmits a similar combined signal which is received by the first station for processing. At the first station, the combined interrupted and uninterrupted signals are separated to provide a continuous signal which is then passed through an amplifier to a transducer or other device. In the same way, the second station also outputs a continuous signal to a transducer or similar device. Thus, simultaneous exchange of signals between the first and second stations is provided.

19 Claims, 5 Drawing Figures

FIG. 4A

CALLING STATION I

| PERIOD | a | b | a | b | a | b | a | b |
|---|---|---|---|---|---|---|---|---|
| CALLING STATION I | AUDIO a | AUDIO b | AUDIO a | AUDIO b | AUDIO a | AUDIO b | AUDIO a | AUDIO b |
| TRANSMIT ($T_I$) |  | AUDIO a DELAYED / AUDIO b | AUDIO a DELAYED / AUDIO b | AUDIO a DELAYED / AUDIO b | AUDIO a DELAYED / AUDIO b | AUDIO a DELAYED / AUDIO b |  |  |
| RECEIVE ($R_I$) |  |  |  | AUDIO A DELAYED / AUDIO B | AUDIO A DELAYED / AUDIO B |  |  |  |
| REPRODUCE |  | PLAY b DELAYED |  | PLAY AUDIO A | PLAY AUDIO B DELAYED |  |  |  |

FIG. 4B

CALLED STATION II

| PERIOD | A | B | A | B | A | B | A | B |
|---|---|---|---|---|---|---|---|---|
| CALLED STATION II | AUDIO A | AUDIO B | AUDIO A | AUDIO B | AUDIO A | AUDIO B | AUDIO A | AUDIO B |
| TRANSMIT ($T_{II}$) |  | AUDIO a DELAYED / AUDIO b | AUDIO a DELAYED / AUDIO b | AUDIO a DELAYED / AUDIO b | AUDIO a DELAYED / AUDIO b | AUDIO a DELAYED / AUDIO b | AUDIO a DELAYED / AUDIO b |  |
| RECEIVE ($R_{II}$) |  |  |  |  |  |  | AUDIO a DELAYED / AUDIO b |  |
| REPRODUCE |  | PLAY a | PLAY b DELAYED | PLAY a | PLAY b DELAYED | PLAY a | PLAY b DELAYED |  |

4,644,524

SIMULTANEOUS COMMUNICATION SYSTEM USING TIME DELAYS

BACKGROUND OF THE INVENTION

1. Field of the Invention

The present invention relates generally to communication systems, and more particularly to such systems, for simultaneously exchanging signals.

2. Description of the Prior Art

Prior art duplex communication systems which provide for simultaneously transmitting and receiving signals have certain disadvantages. The most common of the prior art systems utilize radio frequencies and comprises two radio stations, each of which transmits signals on a different radio frequency channel. Thus the transmitter and receiver of each station operate on different frequencies. Utilizing two radio frequency channels is undesirable in that it requires an additional channel in a crowded radio frequency spectrum. In addition, the use of two radio frequency channels at each station predisposes the station to overload of its receiver by its own transmitter of the same station.

Another prior art duplex communication system employs compression and expansion of signals in the time domain along with transmission and reception at a rapid rate in order to provide apparently simultaneous signal transmission and reception. This system requires highly specialized magnetic recording and reproduction devices to effect the compression and expansion. An example of this system is shown in U.S. Pat. No. 3,827,052, which issued on July 30, 1974 to Tanaka for "Simultaneous Radio Communication System Between Two Stations".

Still another such prior art duplex communication system which is similar to the system of U.S. Pat. No. 3,827,052 is shown in U.S. Pat. No. 4,086,429, which issued on Apr. 25, 1978 to Kotezawa et al. for "Synchronizing System for Use in Telecommunication". This system utilizes pairs of bucket brigade devices (BBD's) to compress and expand the signals. These devices function as analog shift registers. A signal is loaded first into one BBD, then into a second BBD. As the second BBD is loaded, the first BBD is unloaded at either twice the loading speed to effect compression or is unloaded at half the loading speed to effect expansion. A BBD is a clocked mechanism, as with a digital shift register. The clock frequency controls the loading and unloading speeds. Preferably four BBD's are utilized at each of two radio stations. Since BBD's are quite expensive, this system may be economically untenable. Further, synchronization of the two stations can be difficult to achieve. One system for synchronization is shown in U.S. Pat. No. 4,086,429 referred to above.

Thus, there is a need for a duplex communication system which provides simultaneous exchange of signals without the time compression and expansion and the synchronization difficulties inherent thereto.

SUMMARY OF THE INVENTION

The present invention comprises a system for simultaneous communication between stations operating on a single frequency. Thus each station has sequential alternating receive and transmit periods, each of a standard predetermined length. A low frequency timing signal controls both the alternate switching of a first radio station between sequential transmit and receive periods and controls the switching of the second station between sequential receive periods and transmit periods which are 180 degrees out of phase with like periods of the first station. When one station is in a transmit period, the other station is in a receive period and vice versa. During the receive period at one station, a signal occurring or produced at the one station is prepared for transmission by the one station by being amplified, restricted in frequency to a predetermined range, and delayed until a transmit period commences. During the subsequent transmit period of the one station, the delayed signal is summed with a signal occurring or produced during the subsequent transmit period whose frequencies have been converted to a frequency range above that of the frequency range of the delayed transmission signal. The summed delayed signal and the frequency converted signal are transmitted together during the transmit period of the one station to the second station under the control of the timing signal. The first station then switches to a receive period under the control of the timing signal.

The receive period of the other or second station is controlled by the timing signal to correspond to the transmit period of the first station. At the second station, the lower frequency components of the summed delayed signals and the frequency converted signals are received, separated in frequency by filters, amplified and reproduced during its receive period.

The higher frequency components of the summed signals, representing the frequency converted signals, are separated in frequency by a filter, reconverted to their original frequency levels, delayed, filtered further, amplified, and reproduced during the subsequent transmit receive period of the second station.

In accordance with the system of the invention, signals for transmission which are generated at one station during both a receive period and the subsequent transmit period are summed or combined for transmission during the subsequent transmit period. At the other station, the received summed or combined signals are separated with the delayed signal being played during the receive period and the reconverted signal, after a time delay, being reproduced during the transmit period subsequent to the receive period.

At the station initiating transmission, i.e. the calling station, a sine wave having a frequency higher than that of any component of the frequency converted signal is added to the summed delayed signals and frequency converted signals for the purpose of providing a synchronizing signal to synchronize the receive and transmit period of the other station to the transmit and receive period, respectively, of the calling station. This synchronizing signal is separated at the other station from the received signal by filtering and detected by use of a phase-locked loop.

The system of the invention provides a number of advantages. Only half the number of delay devices required by a time domain compression system is employed. The synchronization signal is operable under very weak signal conditions with a high noise level. The system is adaptable to any modulation system including single sideband. For any given timing speed there is less delay of the signals than in a time domain compression-expansion system. The system of the invention is also applicable for simultaneous communication stations utilizing infrared light as the medium of transmission.

BRIEF DESCRIPTION OF THE DRAWINGS

FIG. 4A is a graphical representation of the transmit periods and receive periods of a calling station; and FIG. 4B is a graphical representation of the alternating transmit periods and receive periods of a called station.

DESCRIPTION FOR THE PREFERRED EMBODIMENTS

Figure 1:
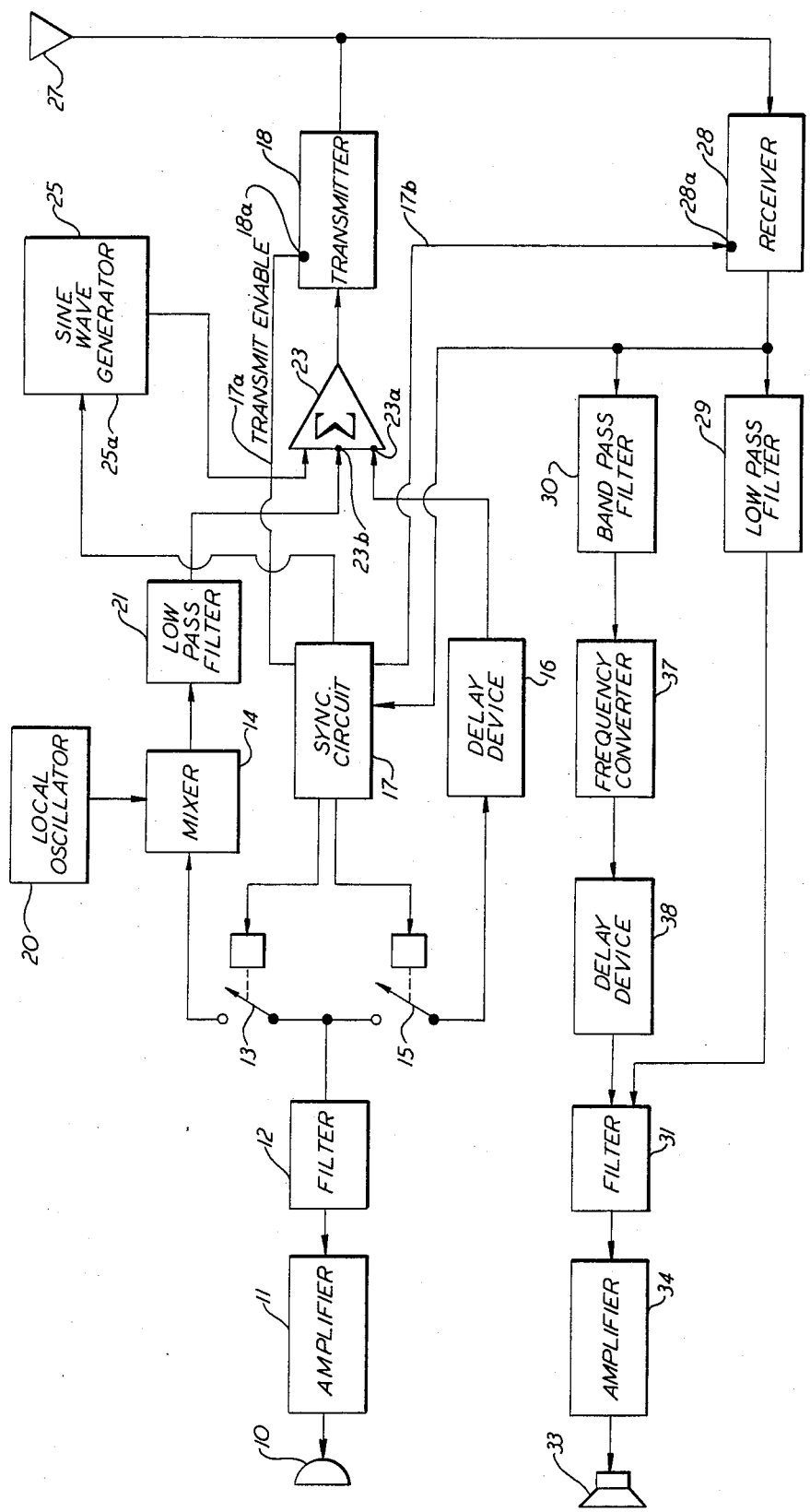
FIG. 1 is a schematic diagram, partially in block form, of a preferred embodiment of the invention.

The invention comprises a communciation system including two stations for simultaneously exchanging signals. Referring to FIG. 1, the circuitry of a first or calling station is depicted. The circuitry of the second or called station is identical to that of the first station. In response to an input signal such as an acoustic input, a transducer such as a microphone 10 provides an electrical signal to an amplifier 11. A bandpass filter 12, coupled to the amplifier 11, provides a signal whose frequency range is restricted, for example, to between 300 and 3000 Hz in the case where the input signal is an aural signal. A switching device or switch 13 is coupled between the filter 12 and a mixer or frequency converter 14. For example, the frequency converter can comprise a balanced modulator. Another switching device or switch is coupled between the filter 12 and a time delay, such as an audio or analog time delay 16.

A synchronizing circuit 17 regulates the switches 13 and 15. The switch 15 is closed and the switch 13 is open when the first station is in a receive period for receiving signals from a second station. The signal from the filter 12, having a restricted frequency, preferably in the range of 300-3000 Hz, passes to the time delay 16 where the filtered signal is loaded. The duration of the time delay substantially corresponds to the time duration of a receive period. By way of example, the delay can be in the range extending between about 5 ms. to about 200 ms., depending upon the frequency of the alternating transmit periods and receive periods. At the end of the receive period and upon the commencement of the subsequent transmit period, the synchronizing circuit 17 enables a transmitter 18, opens the switch 15, and closes the switch 13 which then connects the input signal from filter 12 to mixer 14.

The mixer 14 is provided with a local oscillator 20. The frequency of the local oscillator 20 is chosen such that the frequency range of the subtractive component of the output signal of the mixer 14 is above the frequency range passed by the bandpass filter 12. For example, if the bandpass filter 12 passes frequencies between 300 and 3000 Hz, the local oscillator 20 can be selected to have a frequency of 6300 Hz, for example. The local oscillator frequency of 6300 Hz would provide an output signal at the mixer 14 having a difference or subtractive frequency component of 300 Hz to 3300 Hz for signals of filter 12 having frequencies in the range of 300 Hz to 3000 Hz (6300 Hz−300 Hz=6000 Hz; 6300−3000 Hz=3300 Hz). It can be seen that the lowest difference frequency, 3300 Hz, for example, is above the maximum frequency of the range of frequencies passed by the filter 12. A low pass filter 21 rejects any additive components in the output signal of the mixer 14, while passing the subtractive components.

The time delay of delay device 16 equals the time duration of the receive period during which the time delay device 16 was loaded. Accordingly, when the switch 13 closes and the switch 15 opens, the delay 16 commencess to unload the delayed output of filter 12 into a first input terminal 23a of a summing amplifier 23. Simultaneously, the output signal of the low pass filter 21, which is the output signal of the filter 12 after a frequency conversion during the transmit period, is applied to a second input terminal 23b of the summing amplifier 23. In addition a sine wave from a generator 25 is introduced into the summing amplifier 23. The sine wave which is to provide a synchronizing signal to a second station is selected to have a frequency higher than the highest frequency component of the output signal of the low pass filter 21. For example, where the output signal of the low pass filter 21 is in the range of 3300–6000 Hz, the frequency of the sine wave generator 25, i.e. the sync frequency, can be selected to be 6500 Hz. Thus the three input signals to the summing amplifier can include the frequency converted signal in the range of 3300 Hz to 6000 Hz, the delayed signal from delay device 16 in the range of 300 Hz to 3000 Hz, and the sync signal from generator 25 of 6500 Hz.

The summed output signal of summing amplifier 23 is coupled to transmitter 18. In transmitter 18, the summed output signal from the summing amplifier modulates the carrier of transmitter 18 which can be an RF carrier, infrared (IR) carrier, or the like. The modulated carrier is radiated from antenna 27 or an output transducer (for example, light emitting diode devices, LED's) in the case of infrared.

In response to the Transmit Enable signal over line 17a from synchronizing circuit 17, the transmitter 18 of the first station provides a series of spaced transmit bursts with no transmission between transmit bursts. The second station sends its transmit bursts during its transmit periods which are in phase with the receive periods of the first station, i.e. in the period between the transmit bursts sent by the first station. After the transmitter 18 of the first calling station sends a transmit burst, the synchronization circuit of the calling station delivers a Receive Enable signal over line 17b to enable its receiver 28. As mentioned above, the synchronization circuit 17 of the first station also closes switch 15 and open switch 13 as its transmit period ends and the receive period begins. The transmit burst then transmitted by the second or called station is coupled by the antenna 27 to the receiver 28 of the first station.

The transmit burst received by the first station from the second or called station comprises two summed components: first, the time delayed output signal of the delay device 16 of the second station which was delayed from the second station's transducer or microphone 10 while the second station was in its receive period; and second, the frequency converted output signal of the low pass filter 21 of the second station, based upon the output from the second station's transducer or microphone 10 while the second station was transmitting in its transmit period. A low pass filter 29 is coupled to the receiver 28. The cut-off frequency of the low pass filter 29 is such that the second component, the frequency converted signal component of the received signal, is blocked.

The first component of the signal received by the first station is passed through the low pass filter 29 which, for example, passes the frequencies of 300 Hz to 3000 Hz, in order to reject the frequency converted signal of the second component. The output of filter 29 is connected to bandpass filter 31 which conveys only signals in the desired frequency range, for example, 300 Hz to 3000 Hz. The filter 31 rejects frequencies above or below those of the output signal of the delay 16 of the second station. The output signal of the filter 31 is applied to an amplifier 34 to drive a loudspeaker 33 or other transducer.

The output signal of the receiver 28 of the first station is also applied to a bandpass filter 30 which passes only the second component, i.e. the frequency converted component. A frequency converter 37 returns or down converts the second component of the received signal to its original frequencies, i.e. as they existed in the output signal of the filter 12 of the second station. The output signal of the frequency converter 37 is applied to a time delay 38 which delays the second component until the first component is reproduced by transducer 33. At this time, which corresponds to the beginning of the next transmit period of the first station, the output signal of the delay device 38 passes through the filter 31 and the amplifier 34 to the transducer 33, thereby completing the reproduction of the transmitted burst of the second station.

The output signal of the receiver 28 is also converted to the synchronizing circuit 17. The synchronizing circuit 17 is shown in detail in FIG. 2. In accordance with the invention, the synchronizing circuit of the station which is initially activated, the calling station, controls the synchronization of both the calling station and the called station. A low frequency oscillator 40 provides a clock signal which controls the frequency of the transmit bursts, i.e. the transmit periods, and the receive periods of the calling station. One input terminal of an OR gate 41 is coupled to the low frequency oscillator 40. By way of example, the clock signal can be a square wave. Further by way of example, the clock frequency can be in the range of about 10 Hz to about 100 Hz. If a transmit burst is transmitted for each one-half cycle of a 100 Hz clock, there would be 50 transmit bursts per second and a corresponding 50 receive periods per second. One input terminal of an AND gate 42 is coupled to the ouput terminal of the OR gate 41. A Standby-Operate switch 43 is coupled between a control voltage source 45 and a second input terminal of the AND gate 42. The output terminal 42a of the AND gate 42 is coupled to an enabling terminal 18a of the transmitter 18 shown in FIG. 1. The input terminal of an inverter 48 (FIG. 2) is also coupled to the output terminal 48a of the AND gate 42. An enabling terminal 28a of the receiver 28 in FIG. 1 is coupled to the output terminal 48a of the inverter 48.

When the calling station is to be initially activated, its Standby-Operate switch is placed in the "Operate" position which causes voltage source 45 to be connected to port 42b of AND gate 42. The AND gate 42 can then can pass the clock signal, at port 42c to provide a Transmit-Enable signal to terminal 18a of the transmitter 18 shown in FIG. 1. In this way, a transmit burst or a transmit period is initiated at the calling station.

The output signal of the AND gate 42 is also applied to the inverter 48. Since the output signal of the inverter 48, the Receive-Enable signal, is the inverse of the output signal of the AND gate 42, the Transmit-Enable signal, the inverted signal serves to enable the receiver 28 shown in FIG. 1. Thus when the calling station is in the Operate mode as determined by switch 43, the clock alternately activates the transmitter and the receiver of the calling station into its transmit periods and the receive periods, respectively.

When the transmitter 18 shown in FIG. 1 is enabled by placing its switch 43 in the Operate position, a transit burst is transmitted as previously described. Assuming the switch 43 of the second or called station is in the Standby position, which corresponds to the second station being in a standby mode, voltage source 45 will not be connected to port 42b and the output signal of the second station's AND gate 42 will therefore be low. With the output terminal 42a low, the second or called station's inverter 48 will enable the second station's receiver 28 shown in FIG. 1. The first station's transmission burst then can be received by the second station's receiver 28.

Figure 2:
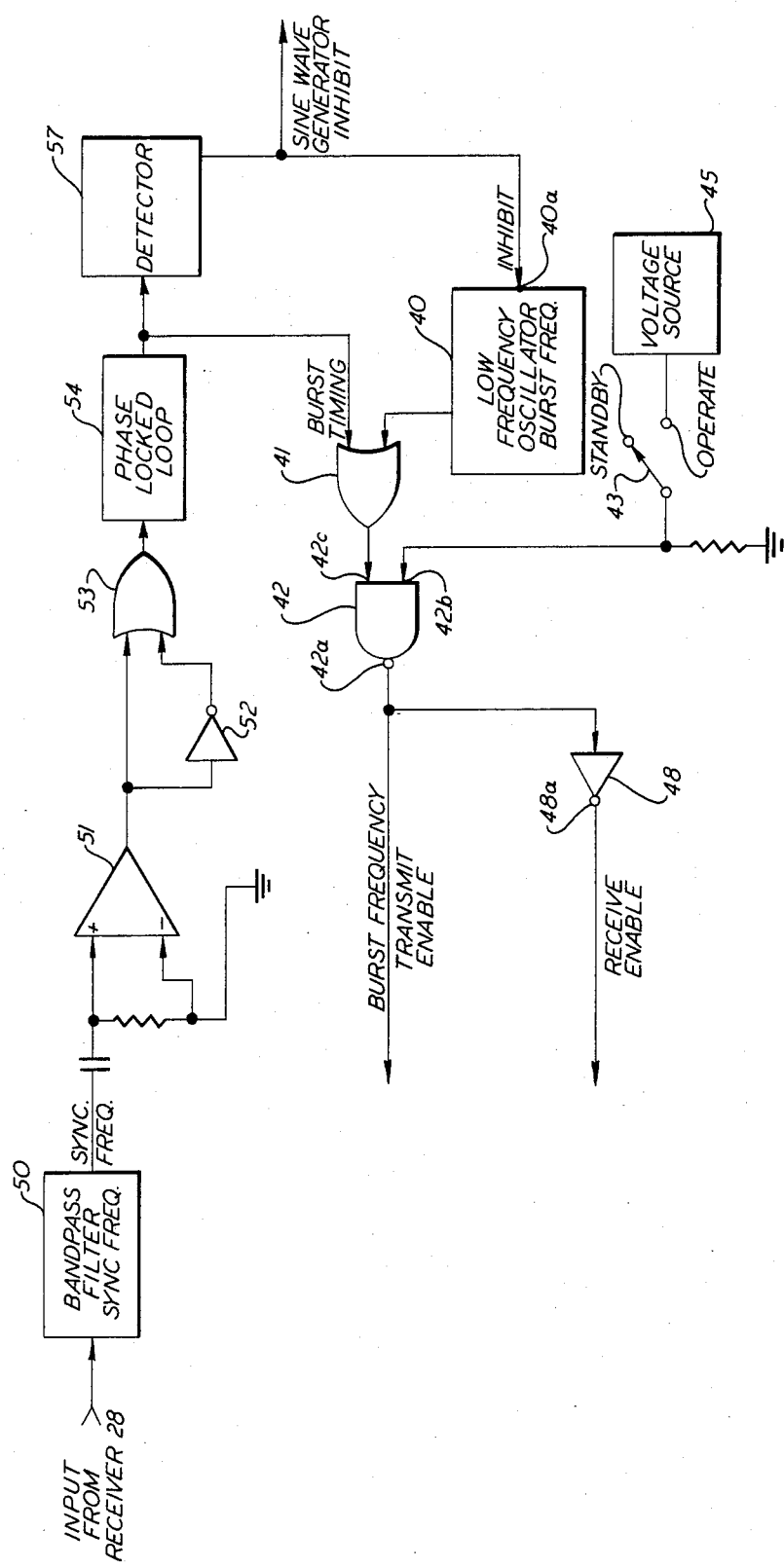
FIG. 2 is a schematic diagram, partially in block form, of a preferred embodiment of the synchronizing circuit of FIG. 1.

Referring to FIG. 2, an input terminal of a bandpass filter 50 is coupled to the output terminal of the receiver 28 of the second or called station. The bandpass filter 50 is tuned to the frequency of the synchronizing sine wave provided by the first station's generator 25. As indicated above, the synchronizing frequency, by way of example can be 6500 Hz. will therefore be low. With the output terminal 42a low, the second or called station's inverter 48 will enable the second station's receiver 28 shown in FIG. 1. The first station's transmission burst then can be received by the second station's receiver 28.

Figure 3:
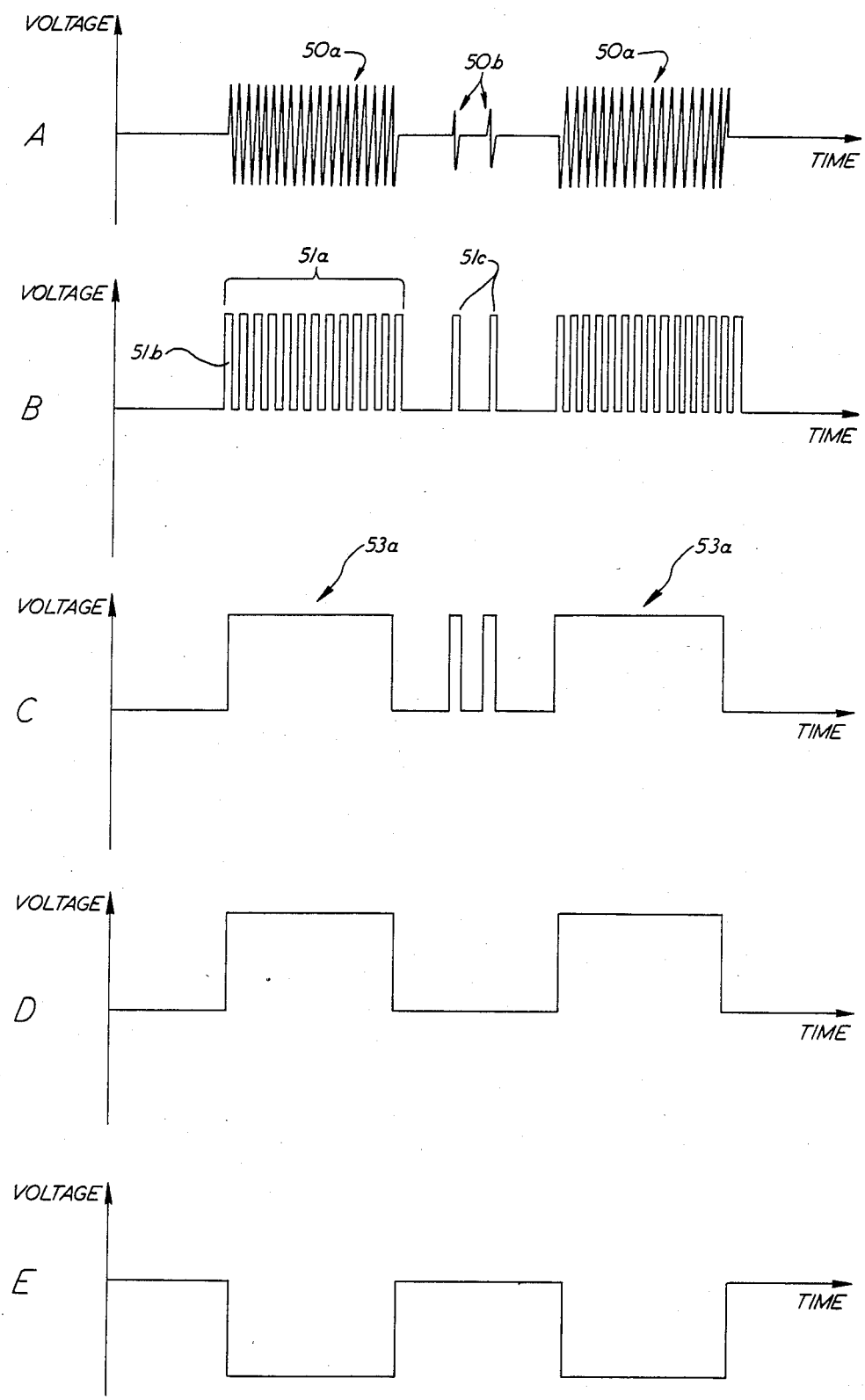
FIG. 3A is a graphical representation of voltage versus time for the output signal of the bandpass filter shown in FIG. 2.
FIG. 3B is a graphical representation of voltage versus time for the output signal of the comparator shown in FIG. 2.
FIG. 3C is a graphical representation of voltage versus time for the output signal of the OR gate in FIG. 2.
FIG. 3D is a graphical representation of voltage versus time for the output signal of the phase-locked loop of FIG. 2.
FIG. 3E is a graphical representation of voltage versus time for the output signal of the inverter in FIG. 2.

Referring to FIG. 2, an input terminal of a bandpass filter 50 is coupled to the output terminal of the receiver 28 of the second or called station. The bandpass filter 50 is tuned to the frequency of the synchronizing sine wave frequency provided by the first station's generator 25. As indicated above, the synchronizing frequency, by way of example, can be 6500 Hz. The output 50a of the bandpass filter 50 which may include noise 50b is shown in FIG. 3A. Input terminals of a comparator 51 are coupled to the output terminal of the bandpass filter 50. The comparator 51 which acts as an infinite clipper provides groups 51a of square waves 51b as shown in FIG. 3B. The output signal of the comparator 51 may include noise pulses 51c as shown in FIG. 3B.

The input of an inverter 52 is coupled to the output terminal of the comparator 51. A first input terminal of an OR gate 53 is also coupled to the output terminal of the comparator 51, which a second input terminal of the OR gate 53 is coupled to the output terminal of the inverter 52. Since the input signals to the OR gate 53 are 180 degrees out of phase, due to inverter 52, each one of the input signals is alternately high. Accordingly, the output signal of the OR gate 53 is continuously high for the group 51a of square waves 51b. The output signal of the OR gate 53 is therefore a series of pulses 53a with a frequency equal to that of the clock signal of the first station's low frequency oscillator 40 and a pulse duration corresponding to the time duration of groups 51a of square waves 51b. The output signal of the OR gate 53 may include noise pulses 53b as shown in FIG. 3C.

An input terminal of a phase-locked loop 54 is coupled to the output terminal of the OR gate 53. The output pulses 53a of the OR gate 53 are utilized to lock the phase-locked loop 54 of the called station. The phase-locked loop removes any noise pulses 53b from the output signal of the OR gate 53. The resulting output signal of the phase-locked loop 54 which is without noise and which is locked in phase with the output signal of the OR gate 53 provides a timing signal for the second or called station to control its transmit periods and the receive periods thereof. FIG. 3D shows the timing pulses 54a of the phase-locked loop 54.

An input terminal of the OR gate 41 of the second or called station is coupled to the output terminal of the phase-locked loop 54. An input terminal of a lock detector 57 is also coupled to an output terminal fo the phase-locked loop 54. The lock detector 57 provides an inhibit signal whenever the phase-locked loop 54 is locked to the synchronizing signal of the transmission from the first or calling station. The inhibit signal at the output terminal of the lock detector 57 is coupled to an inhibit terminal 40a of the low frequency oscillator 40 of the second or called station. As a result, the low frequency oscillator 40 of a called station becomes inhibited upon the receipt of the initial transmit burst from the calling station. This initial transmit burst causes the phase-locked loop to produce a signal phased to the burst frequency of the calling station, i.e. the frequency of the local oscillator 40 of the calling station. The inhibiting of the low frequency oscillator of the second or called station persists as long as the lock detector 57 senses that the phase-locked loop 54 of the called station is locked to the burst frequency received from the calling station. With the low frequency oscillator 40 of the called station inhibited, the only input to OR gate 41 is the burst frequency signal from the phase-locked loop 54 of the called station.

The output terminal of the lock detector 57 is also coupled to an inhibit terminal 25a of the sine wave generator 25 of the second or called station as shown in FIG. 1. The reason for inhibiting the sine wave generator is to prevent the transmission of a synchronizing signal by a called station when a called station sends a transmit burst to the calling station. This insures that once a calling station is activated to commence transmission, the synchronizing signal of the calling station maintains synchronism for the calling station as well as the called station which is controlled by its phase-locked loop signal as determined by the synchronizing signal of the calling station. Even though the called station transmits by placing its Standby-Operate switch 43 in the Operate position, its phase-locked loop signal through OR gate 41 and AND gate 42 controls the burst periods and the transmit periods of the called station. Thus upon closing the switch 43, by an operator or automatic means, the AND gate 42 passes the output signal of the phase-locked loop 54 to become the second station's timing for its transmit periods and receive periods.

The output terminal 42a of the AND gate 42 of the called station is coupled to the Transmit-Enable input 18a of the transmitter of the called station, while the output terminal 48a of the inverter 48 is coupled to the Receive-Enable terminal 28a of the receiver of the called station. When the called station is receiving signals from the first or calling station, the switch 15 of the called station is closed and the switch 13 in the called station is open. When the second station is transmitting, its switch 15 is open and its switch 13 is closed. Thus it can be seen that with two such stations, the calling station utilizes its low frequency oscillator 40 as a timing reference while the called station uses the output signal of its phase-locked loop 54 which is locked to the frequency of the low frequency oscillator of the calling station as its timing reference.

FIG. 4A and FIG. 4B are timing diagrams for a calling station I and a called station II, respectively. In FIG. 4A, alternate receive periods and transmit periods are designated "a" and "b", respectively. A transmit period in which transmission is initiated by the calling station is designated "$T_I$". The chart shows that during period "b", both the input signal, for example, an audio signal designated "audio a delayed" is transmitted simultaneously with the input signal of period "b" designated "audio b".

In FIG. 4B in period A thereof which corresponds to period b of the calling station, the receiver of the called station designated "$R_{II}$" receives from the calling station both "audio a delayed" and "audio b". Accordingly, FIG. 4B shows that the called station in period "A" can reproduce "audio a delayed", designated "play a". In the subsequent period "B", the chart shows that the called station reproduces "audio b" as designated by "play b" delayed.

In FIG. 4A in the second period "a" from the left of the chart, the activation of the receiver of the calling station, designated "$R_I$" is shown without the designation of a received audio signal since at the corresponding period "B", the called station is not transmitting.

In FIG. 4B in the second period designated "B", the transmitter of the called station has been enabled by placing the Standby-Operate switch 43 in the "Operate" position. Accordingly, the chart of FIG. 4B in the second period designated "B" shows both "audio A delayed" and "audio B" being transmitted. In the corresponding period of the chart of FIG. 4A, namely the third period from the left designated "a", the receiver, "$R_I$" of the calling station is shown as receiving "audio A delayed" and "audio B" from the called station.

Finally, the chart in FIG. 4A shows the reproduction of the received signal in the same period "a" by the notation "play audio A" and in the subsequent period "b" by the notation "play audio B delayed".

The above system is not restricted to use with analog signals such as those generated by the microphone 10 shown in FIG. 1. Thus, the system may be used with other signal formats such as digital signals.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A system adapted to be disposed at one station for simultaneously transmitting and receiving information, with respect to a corresponding system disposed at another station, in a sequence having at least one predetermined transmit period followed by a predetermined receive period comprising:

means for providing an input signal to be transmitted;
   means for converting said input signal to a signal having a different frequency;

means for delaying the passage of said input signal therethrough for a predetermined time delay which corresponds to a portion of a receive period;

means for providing a clock signal to define the sequence of predetermined transmit periods and predetermined receive periods;

means connected to the input signal providing means and responsive to the clock signals for sequentially switching said input signal to the delaying means during each receive period and to the frequency converting means during each transmit period;

means for summing the switched output of the delaying means and the switched output of the frequency converting means to form a summed signal;

means responsive to the clock signal for transmitting the summed signal during each transmit period;

means responsive to the clock signal for receiving a summed signal transmitted from another station;

means for severing the delayed signal from the received summed signal;

means for separating said signal having a different frequency from the received summed signal;

means for reconverting said signal having a different frequency to the frequency of the input signal;

means for retarding the reconverted signal for a predetermined time of retardation corresponding to the predetermined time delay of the delaying means;

means connected to the retarding means and the severing means for reproducing the severed delayed signal during the receive period and the retarded reconverted signal during the subsequent transmit period, whereby the input signal for each receive period and the transmit period subsequent thereto can be transmitted to the other station during each subsequent transmit period as the signal transmitted by the other station and received during a receive period is reproduced during both the receive period and the transmit period subsequent thereto to provide simultaneous transmitting of the input signal and reproducing of the received signal.

2. A system in accordance with claim 1 in which the minimum value of the frequency of the different frequency is greater than the maximum value of the frequency of the input signal.

3. A system in accordance with claim 1 in which the means for converting the frequency of the input signal to a different frequency comprises:
a source of a reference signal having a predetermined frequency; and
means for mixing the input signal and the reference signal, one of the sum and difference frequencies of the input signal the reference signal comprising the different frequency of the converting means.

4. A system in accordance with claim 3 in which the different frequency is the difference between the reference signal and the input signal with the reference signal having a frequency greater than the maximum frequency of the input signal to the extent that the different frequency is greater than the maximum frequency of the input signal.

5. A system in accordance with claim 1 in which the means for delaying passage of the input signal therethrough for a predetermined time delay comprises an analog delay device.

6. A system in accordance with claim 1 in which the means for delaying passage of the input signal therethrough for a predetermined time delay comprises a digital delay device.

7. A system in accordance with claim 1 in which the means for providing a clock signal to define the sequence of predetermined transmit periods and predetermined receive periods defines transmit periods and receive periods of substantially equal duration.

8. A system in accordance with claim 1 in which the means for summing the switched output of the frequency converting means to form a summed signal comprises a summing amplifier.

9. A system in accordance with claim 1 in which the means for severing the delayed signal from the received summed signal comprises means for passing only the band of frequencies extending downwardly from substantially the maximum frequency of the input signal.

10. A system in accordance with claim 9 in which the means for passing only the band of frequencies comprises a low pass filter having a cutoff frequency corresponding substantially to the maximum frequency of the input signal.

11. A system in accordance with claim 1 in which the means for separating the signal having a different frequency from the received summed signal comprises means for admitting only the band of frequencies of the summed signal which is limited to frequencies of the output of the means for converting the frequency of the input signal to a different frequency.

12. A system in accordance with claim 11 in which the means for admitting only the band of frequencies comprises a pass band filter device having its cutoff frequencies substantially at the oppositely disposed maximum and minimum frequencies of the band.

13. A system in accordance with claim 1 in which the means for reconverting the different frequency of the separated signal comprises means for down-converting the frequency of the separated signal to substantially the frequency of the input signal.

14. A system in accordance with claim 1 in which the means for retarding the reconverted signal for a predetermined time of retardation corresponding to the predetermined time delay of the delaying means comprises an analog delay circuit.

15. A system in accordance with claim 1 in which the means for retarding the reconverted signal for a predetermined time of retardation corresponding to the predetermined time delay of the delaying means comprises a digital delay circuit.

16. A system in accordance with claim 1 in which the means converted to the retarding means and the severing means for reproducing the severed delay signal during the receive period and retarded reconvereted signal during the subsequent transmit period comprises an amplifier device having an input to receive each of the severed delay signal and the retarded reconverted signal.

17. A system in accordance with claim 1 and further comprising means for providing a preselected frequency distinct from the frequency of the delayed input signal and the different frequency of the delayed input signal and the different frequency of the frequency converted input signal to be transmitted by the transmitting means with the summed signal during each transmit period, the preselected frequency being adapted to be detected by the system of another station to provide a synchronizing signal for each of the transmit periods and receive periods thereof.

18. A method adapted for use at one station for simtaneously transmitting and receiving information, with respect to another station, in a sequency having a least one predetermined transmit period followed by a predetermined receive period comprising the steps of:
- providing an input signal to be transmitted;
- converting the input signal to a signal having a different frequency;
- delaying the passage of the input signal for a predetermined time delay which corresponds to a portion of a receive period;
- providing a clock signal to define the sequence of predetermined transmit periods and predetermined receive periods;
- switching to the delayed input signal during each receive period and to the frequency converted signal during each transmit period;
- summing the switched delayed input signal and the switched frequency converted signal to form a summed signal;
- transmitting the summed signal during each transmit period in response to the clock signal;
- receiving a summed signal transmitted from another station in response to the clock signal;
- severing the delayed signal from the received summed signal;
- separating said signal having a different frequency from the received summed signal;
- reconverting the different frequency of the separated signal to the frequency of the input signal;
- retarding the reconverted signal for a predetermined time of retardation corresponding to the predetermined time delay of the delay signal;
- reproducing the severed delayed signal during the receive period and the retarded reconverted signal during the subsequent transmit period,
- whereby the input signal for each receive period and the transmit period subsequent thereto can be transmitted to the other station during each subsequent transmit period as the signal transmitted by the other station and received during a receive period is reproduced during both the receive period and the transmit period subsequent thereto to provide simultaneous transmitting of the input signal and reproducing of the received signal.

19. A system adapted to be disposed at one station for simultaneously transmitting and receiving information, with respect to a corresponding system disposed at another station, in a sequence having at least one predetermined transmit period followed by a predetermined receive period comprising:
- means for providing an input signal to be transmitted;
- means for converting the format of the input signal to a signal having a predetermined different format;
- a first circuit means for delaying the passage of one of the input signal and the different format signal therethrough for a predetermined time delay which corresponds to a portion of a receive period;
- a second circuit for passing the other of the input signal and the different formal signal;
- means for providing a clock signal to define the sequence of predetermined transmit periods and predetermined receive periods;
- means connected to the input signal providing means responsive to the clock signals for sequentially switching the input signal to the first circuit including means during each receive period and to the second circuit during each transmit period;
- means for summing the switched output of the first circuit and the second circuit to form a summed signal;
- means responsive to the clock signal for transmitting the summed signal during each transmit period;
- means responsive to the clock signal for receiving a summed signal transmitted from another station;
- means for severing the delayed signal of the first circuit from the received summed signal;
- means for separating the signal of the second circuit from the received summed signal;
- means for reconverting the format of the signal having a predetermined different format to the format of the input signal;
- means for retarding the severed delayed signal for a predetermined time of retardation corresponding to the predetermined time delay of the delaying means;
- means for reproducing the delayed signal from the severing means during the receive period and the signal from the second circuit during the subsequent transmit period after the reconverting and retarding, whereby the input signal for each receive period and the transmit period subsequent thereto can be transmitted to the other station during each subsequent transmit period as the signal transmitted by the other station and received during a receive period is reproduced during both the receive period and the transmit period subsequent thereto to provide simultaneous transmitting of the input signal and reproducing of the received signal.

* * * * *

UNITED STATES PATENT AND TRADEMARK OFFICE
CERTIFICATE OF CORRECTION

PATENT NO. : 4,644,524
DATED : February 17, 1987
INVENTOR(S) : David L. Emery

It is certified that error appears in the above-identified patent and that said Letters Patent is hereby corrected as shown below:

Column 11, line 3, change "sequency" to --sequence--.

Signed and Sealed this

Twentieth Day of December, 1988

*Attest:*

DONALD J. QUIGG

*Attesting Officer*   *Commissioner of Patents and Trademarks*